W. A. BERNARD.
PRUNING OR LIKE IMPLEMENT.
APPLICATION FILED DEC. 22, 1911.
1,104,768.
Patented July 28, 1914.
2 SHEETS—SHEET 2.
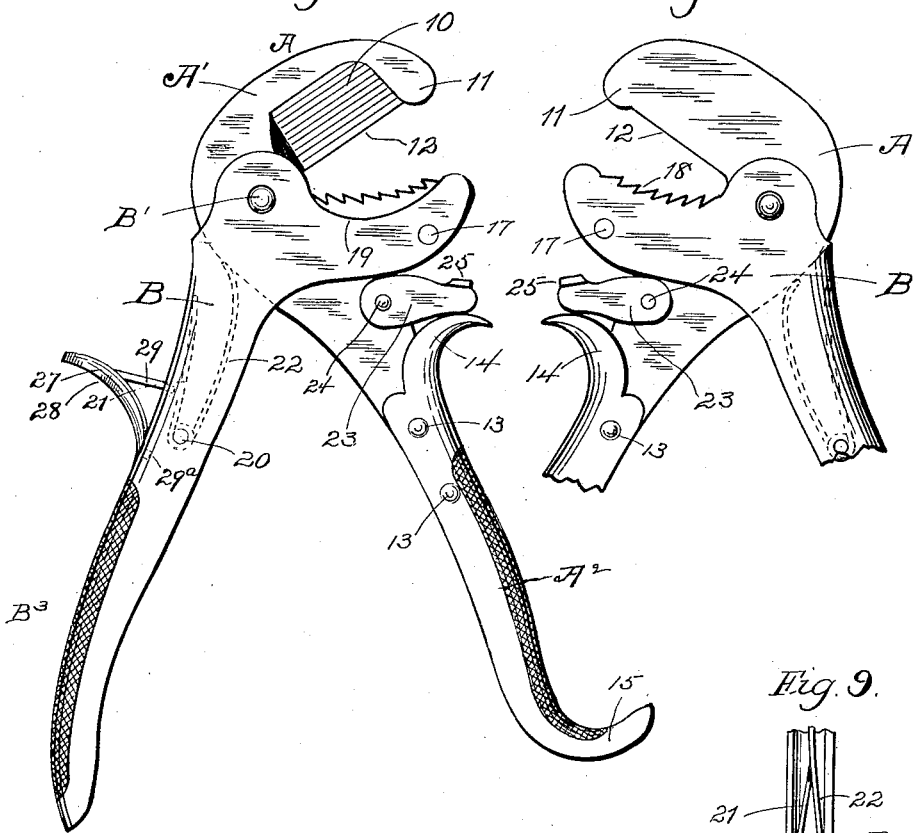
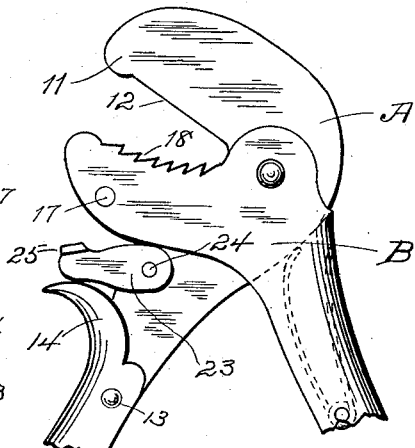
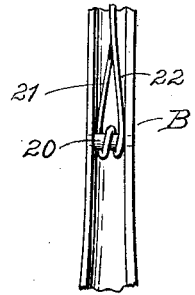
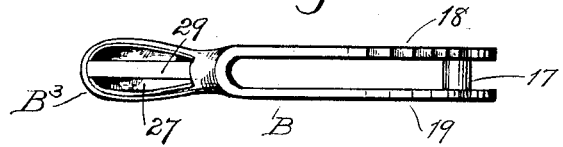
WITNESSES:
J. S. Coleman
Thomas Hewes
INVENTOR.
William A. Bernard,
BY
Beach & Fisher
ATTORNEYS.

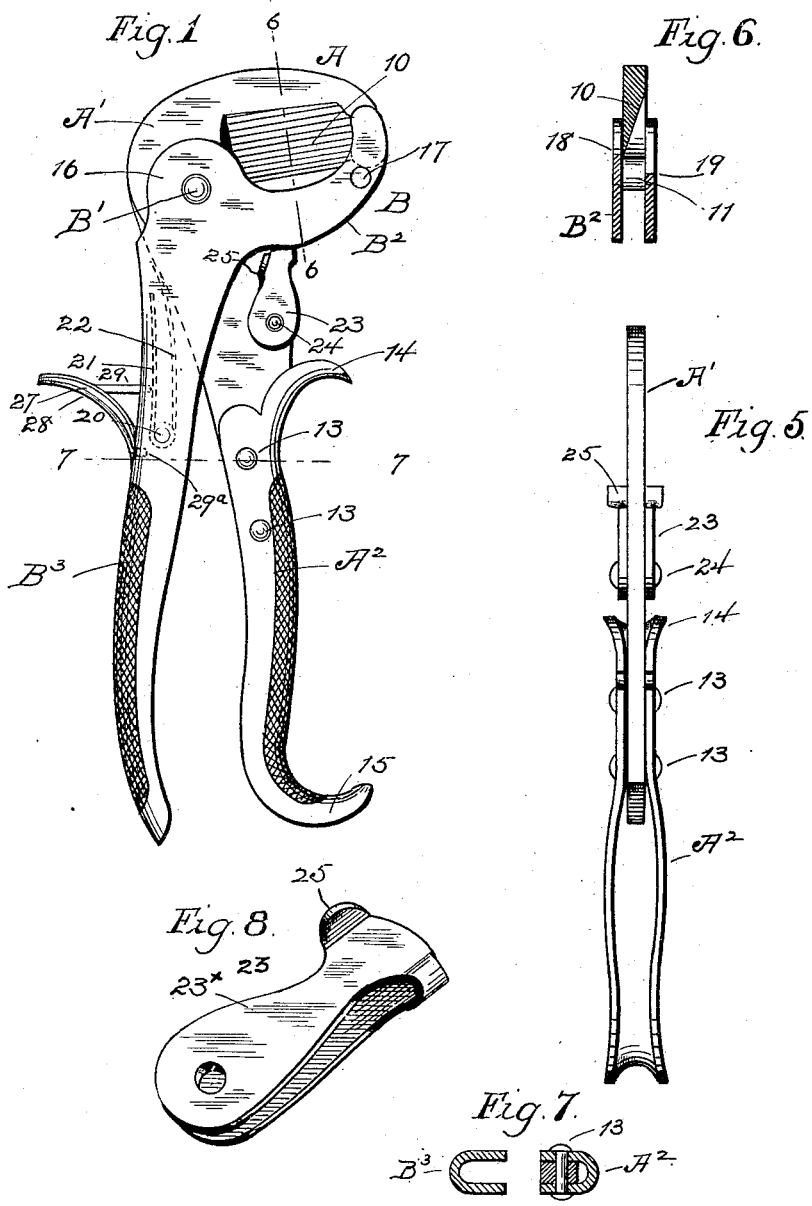

UNITED STATES PATENT OFFICE.

WILLIAM A. BERNARD, OF NEW HAVEN, CONNECTICUT, ASSIGNOR TO THE WILLIAM SCHOLLHORN COMPANY, OF NEW HAVEN, CONNECTICUT, A CORPORATION OF CONNECTICUT.

PRUNING OR LIKE IMPLEMENT.

1,104,768.  Specification of Letters Patent.  Patented July 28, 1914.

Application filed December 22, 1911. Serial No. 667,382.

*To all whom it may concern:*

Be it known that I, WILLIAM A. BERNARD, of the city of New Haven, county of New Haven, and State of Connecticut, have invented new and useful Improvements in Pruning or like Implements, of which the following is a full, clear, and exact description.

This invention relates to pruning shears or like implements, and the primary object of my invention is to provide a device of this kind which can be made for the most part of sheet metal, whereby the manufacture of the device is simplified and made less expensive than heretofore.

Other objects of the invention are to provide improved means for locking together the spring-pressed jaws when the device is not in use; to improve the construction of the cutting jaws; and to increase generally the efficiency, compactness and durability of devices of this type.

The novel features of the invention will appear clearly from the following description and claims.

In the accompanying drawings, illustrative of a preferred form of the invention, Figure 1 is a side elevation of the shears, showing the jaws locked in their closed position; Fig. 2 is a similar view showing the jaws opened to the full extent; Fig. 3 is a fragmentary view corresponding to Fig. 2 but showing the device from the opposite side; Fig. 4 is a top plan view of one of the pivoted cutting members shown in Fig. 2; Fig. 5 is a rear edge view of the other pivoted cutting member; Fig. 6 is a transverse section through the jaws, taken on line 6—6, Fig. 1; Fig. 7 is a section on line 7—7, Fig. 1; Fig. 8 is an enlarged perspective view of the locking member or dog; and Fig. 9 is a fragmentary detail view showing the mounting of the spring which normally holds the jaws separated from each other.

Referring to the drawing, A denotes a cutting member having a jaw portion $A'$ and a handle or lever portion $A^2$; and B indicates the other cutting member, which is pivoted to the jaw $A'$ at $B'$, and comprises a jaw $B^2$ to coöperate with the jaw $A'$, and a handle or lever portion $B^3$. The jaw $A'$ is provided with a beveled or chamfered cutting blade 10, and at the end of the jaw, the same is provided with an overhanging nose or guard 11 which projects slightly beyond the line of the cutting edge 12 (Figs. 2 and 3). The jaw $A'$ is extended integrally below the pivot $B'$, and at its lower end it has applied thereto the handle $A^2$, which is preferably formed of a sheet metal blank bent into U-shaped cross section to embrace the shank of the jaw $A'$. The curved portion of the sheet metal handle $A^2$ is placed outermost, in order that a good grip may be obtained, and said handle may be fixed to the shank of the jaw $A'$ by any appropriate means, such as the rivets 13. The upper and lower extremities, 14 and 15 respectively, of said handle are preferably curved or flared outwardly in order to increase still further the efficiency of the grip.

The cutting member B is preferably formed entirely of sheet metal. It is made from a suitable blank bent into U-shaped cross section, the curved portion being outermost and constituting a satisfactory gripping surface on the handle $B^3$. The cross sectional area of the handle $B^3$ corresponds closely to that of the handle $A^2$, as will be seen from Fig. 7. The jaw $B^2$ is formed of two side plates of sheet metal extending integrally from the handle $B^3$ and straddling the jaw $A'$. The pivotal connection $B'$ between the jaws comprises a suitable pin or rivet passing through lugs or ears 16 formed integral with the side portions of the lower jaw $B^2$ and abutting the jaw $A'$ at the opposite face portions thereof. The side plates or portions of the lower jaw are maintained permanently in their parallel relation by means of a distance pin 17, which holds said portions apart to a sufficient extent to permit the overhanging guard 11 of the upper jaw to enter the space between the upwardly directed extremities of the side portions of the duplex lower jaw. Moreover the pin 17 forms a stop to limit the movement of the guard 11, whereby the closing movement of the opposing jaws is arrested at the proper point.

That side portion of the duplex jaw $B^2$ which coöperates directly with the blade 10, in cutting, is serrated, as indicated at 18, whereby the twigs or branches to be cut are firmly positioned on the lower jaw and prevented from sliding along the latter when the cutting blade is moved downward by a suitable manipulation of the handles $A^2$, $B^3$. As the lower jaw portion opposite that having the serrated edge 18 does not coöperate directly with the cutting blade, said jaw portion is of less width, that is, its upper edge 19, which is of plain curved form, does not extend as high as the serrated edge previously described. In other words, the serrated edge of the duplex lower jaw is appreciably closer to the cutting edge of the other jaw than is the plain edge of said duplex jaw. This arrangement of the plain edge 19 does not prevent, however, its effective action as a sort of anvil for the object placed between the opposing jaws of the device.

The jaws A', B² are normally held separated from each other, as shown in Fig. 2, by means of suitable spring mechanism associated with the cutting members. In the embodiment illustrated this mechanism comprises a pin 20 extending between the side plates of the handle or shank B³, said pin having a suitable wire spring coiled about it with one end, 21, bearing against the wall of the handle B³ and the other end, 22, bearing against the rear edge portion of the shank of the jaw A'. The tendency of this spring is to press the handle A² toward the right with reference to Fig. 2, thereby separating the jaws and the handles. The end or branch 22 of the spring abuts the shank of the jaw A at a point within the U-shaped shank or handle of the other jaw and is confined substantially within said handle or shank in all positions of the jaws. Hence the spring is concealed from view and protected from injury or breakage.

After a twig has been cut by bringing the handles together, said handles assume the position shown in Fig. 2 as soon as the operator sufficiently releases the pressure on them, as is well understood. The separating movement of the handles is arrested by means of a stop or dog associated with the shank of the jaw A'. In the embodiment shown, this dog, denoted by reference character 23, is formed of a sheet metal plate suitably cut and bent to present opposite inter-connected side plates 23ˣ which straddle the shank of the jaw A'. The dog is pivotally mounted on said shank by means of a pin 24 passing through the same and through the side plates 23ˣ. When the locking dog is swung upward into the position shown in Fig. 1, the upper end of the dog will abut the lower edge of the jaw B² at one side of the pivot B' and thereby prevent the swinging of the member B on the pivot B' into open position. Lugs 25 project laterally from the dog on opposite sides so that the manipulation of the dog by the fingers of the operator will be facilitated. The dog 23 is swung down into engagement with the handle extension 14 when the shears are to be used, whereby the dog is effectively supported in a laterally directed position as shown in Figs. 2 and 3. In this position it forms a stop device to limit the separating movement of the opposing jaws, inasmuch as the lower edge portions of the jaw B² move into abutment with the side edges of the side plates 23ˣ when the jaws are separated by the spring to the extent indicated in Figs. 2 and 3. Thus it will be understood that the dog 23 forms a device to lock the jaws together and to arrest their separating movement at a pre-determined point. The extension 14 serves the double function of supporting the dog in one of its positions and of increasing the gripping surface of one of the handles.

In the larger sizes of pruning shears, it is preferable to provide the handle B³ with a gripping extension 27 corresponding to the extension 14 on the handle A². The extension 27 is made up as a separate sheet metal unit having a gripping surface 28 and tangs or shanks 29 29ᵃ projecting through openings in the outer wall portion of the handle B³ and riveted or clenched to said handle.

While the foregoing description is a detailed one so far as it concerns the embodiment of my invention shown in the drawing, it is to be understood that the invention is susceptible of numerous other embodiments, and that I have not attempted to describe the modifications of the construction which might be adopted without digressing from my inventive idea as expressed in the claims.

What I claim is:—

1. In a pruning implement, the combination of a cutting member comprising substantially parallel jaw portions one of which has its edge located above the edge of the other, a distance piece extending between said jaw portions near the extremities thereof, and a blade having a beveled edge movable between said jaw portions, said blade being provided at one end with a depending guard to abut said distance pin; substantially as described.

2. Pruning shears comprising a cutting member with spaced jaw portions, a second cutting member straddled by and pivoted to the first member, a dog straddling the shank of the second member and pivoted to said member, said dog having means to engage the lower edges of the aforesaid spaced jaw portions, and means on the shank of said second member to support said dog in a laterally directed inoperative position; substantially as described.

3. In a pruning or like implement, the combination of a member having spaced jaw portions, a second member straddled by and pivoted to the first member, and a dog straddling the shank of the second member and engageable with said spaced jaw portions to lock said members together; substantially as described.

4. In a pruning or like implement, the combination of a member having spaced jaw portions, a second member straddled by and pivoted to the first member, and a locking device to lock said members in closed position, comprising a sheet metal plate bent to straddle the shank of said second member and pivoted thereto; substantially as described.

5. In a pruning or like implement, the combination of a member having a jaw and a handle portion, a second member pivoted to the first and having a jaw and a shank portion, and a locking dog straddling said shank portion and having oppositely projecting lugs; substantially as described.

6. Pruning shears comprising coöperating pivoted jaws each equipped with a suitable handle or shank, a dog pivoted to one of said shanks and operative in one position to lock the jaws together, and a gripping extension on said shank to support said dog in another position in which it forms a stop to arrest the opening movement of the jaws at a pre-determined point; substantially as described.

7. In a pruning or like implement, the combination of pivoted jaws each having a suitable handle or shank, a dog movably connected to one of said shanks and operative in one position to lock the jaws together, and a member extending laterally from said shank to support said dog in its inoperative position and serving to facilitate the gripping of the shank by the hand of the operator; substantially as described.

In witness whereof, I have hereunto set my hand on the sixteenth day of December, 1911.

WILLIAM A. BERNARD.

Witnesses:
 THOMAS HEWES,
 SAMUEL H. FISHER.

Copies of this patent may be obtained for five cents each, by addressing the "Commissioner of Patents, Washington, D. C."